United States Patent
Holtz et al.

(10) Patent No.: US 8,327,323 B2
(45) Date of Patent: Dec. 4, 2012

(54) AUTOMATIC COPYING BY ANCESTOR IN OBJECT-ORIENTED LANGUAGES

(75) Inventors: Karen Holtz, Jerusalem (IL); Eitan Marcus, Haifa (IL); Ronny Morad, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1030 days.

(21) Appl. No.: 12/329,775

(22) Filed: Dec. 8, 2008

(65) Prior Publication Data

US 2010/0146482 A1 Jun. 10, 2010

(51) Int. Cl.
  *G06F 9/44* (2006.01)
(52) U.S. Cl. ......... 717/108; 717/116; 719/316; 707/818
(58) Field of Classification Search ........................ None
  See application file for complete search history.

(56) References Cited

U.S. PATENT DOCUMENTS

| | | | | |
|---|---|---|---|---|
| 5,325,533 A * | 6/1994 | McInerney et al. | ........... | 717/107 |
| 5,421,016 A * | 5/1995 | Conner et al. | ........... | 717/146 |
| 5,432,925 A * | 7/1995 | Abraham et al. | ........... | 719/316 |
| 5,493,680 A * | 2/1996 | Danforth | ........... | 717/108 |
| 5,615,400 A * | 3/1997 | Cowsar et al. | ........... | 719/332 |
| 5,692,195 A * | 11/1997 | Conner et al. | ........... | 719/316 |
| 5,832,268 A * | 11/1998 | Anderson et al. | ........... | 719/316 |
| 5,915,253 A * | 6/1999 | Christiansen | ........... | 1/1 |
| 5,978,582 A * | 11/1999 | McDonald et al. | ........... | 717/104 |
| 6,085,034 A * | 7/2000 | Danforth | ........... | 717/108 |
| 6,182,156 B1 * | 1/2001 | Togawa | ........... | 719/316 |
| 6,550,057 B1 * | 4/2003 | Bowman-Amuah | ........... | 717/126 |
| 6,704,747 B1 * | 3/2004 | Fong | ........... | 1/1 |
| 6,738,977 B1 * | 5/2004 | Berry et al. | ........... | 719/332 |
| 6,968,536 B2 * | 11/2005 | Jazdzewski | ........... | 717/106 |
| 6,976,244 B2 * | 12/2005 | Akella et al. | ........... | 717/116 |
| 7,136,873 B2 * | 11/2006 | Smith et al. | ........... | 1/1 |
| 7,143,416 B1 * | 11/2006 | Nachef et al. | ........... | 719/315 |
| 7,461,053 B2 * | 12/2008 | Trappen et al. | ........... | 1/1 |

(Continued)

OTHER PUBLICATIONS

Title: A new class generateion mechanism by method integration, author: Maruyama et al, source: IEEE, dated: 1998.*

(Continued)

*Primary Examiner* — Chameli Das
(74) *Attorney, Agent, or Firm* — Cantor Colburn LLP; Suzanne Erez

(57) ABSTRACT

A method of automatically defining a new class in a class hierarchy includes creating a descendent class that descends from one or more specified ancestor classes; sequentially analyzing each class along each inheritance path from the specified ancestor classes to a specified similar class to identify each class item in each class that is not selected from the specified ancestor classes; storing a respective pointer for each class item identified in each class that is not inherited by the class referencing the class item and associated with the class; storing a respective pointer for each class item identified in each class that is inherited and redefined by the class referencing the class item and being associated with the class if a pointer referencing the class item is not already stored; and copying each class item referenced by a stored pointer to the descendent class.

14 Claims, 6 Drawing Sheets

U.S. PATENT DOCUMENTS

| | | | |
|---|---|---|---|
| 7,552,444 B2 * | 6/2009 | Alcorn et al. | 719/316 |
| 7,730,450 B2 * | 6/2010 | Mercer | 717/120 |
| 7,962,888 B2 * | 6/2011 | Rojer | 717/100 |
| 2006/0036656 A1 * | 2/2006 | Mercer | 707/203 |
| 2007/0088723 A1 * | 4/2007 | Fish | 707/100 |
| 2007/0256051 A1 * | 11/2007 | Rojer | 717/104 |
| 2008/0059950 A1 | 3/2008 | Seitz et al. | |
| 2008/0092111 A1 | 4/2008 | Kinnucan et al. | |
| 2008/0141219 A1 | 6/2008 | Chinnici | |

OTHER PUBLICATIONS

Title: Dynamic Class hierarchy mutation, author: Su et al, source: IEEE, dated: 2006.*

Katsuhisa Maruyama, Ken-ichi Shima, "An Automatic Class Generation Mechanism by Using Method Integration," IEEE Transactions on Software Engineering, vol. 26, No. 5, pp. 425-440, May, 2000.

* cited by examiner

AUTOMATIC COPYING BY ANCESTOR IN OBJECT-ORIENTED LANGUAGES

BACKGROUND

Exemplary embodiments of the present invention relate to object-oriented software development, and more particularly, to class hierarchies of object-oriented applications.

During the design of a complex software system, it can be essential to decompose the system into smaller and smaller parts, each of which may then be refined independently. Object-oriented analysis and design, which directly reflects the topology of high-order, object-oriented programming languages such as Smalltalk, Object PASCAL programming language, C++, the Common Lisp Object System (CLOS), Eiffel, Visual C#, and JAVA programming languages, leads to an object-oriented decomposition. The underlying concept of object-oriented analysis is that one should model software systems as collections of cooperating objects, treating individual objects as instances of a class within a hierarchy of classes. A class is a set of objects that share a common structure, common behavior, and common semantics. Thus, the class hierarchies within a complex system, which provides a ranking or ordering of the abstractions within a design, highlight the common behavior and structure within the system.

Object-oriented programming can thus be defined as a method of implementation in which programs are organized as cooperative collections of objects, each of which represents an instance of some class, and whose classes are all members of a hierarchy of classes united through inheritance relationships. Inheritance is an essential element of object-oriented systems. Essentially, inheritance defines a relationship among classes, wherein one class shares the structure or behavior defined in one or more classes (respectively denoting single inheritance and multiple inheritance). Inheritance thus represents a hierarchy of abstractions in which a subclass inherits from one or more superclasses. Typically, a subclass augments or redefines the existing structure and behavior of its superclasses by specializing the more general structure or behavior of its superclasses.

As a software system developed using an object-oriented programming language evolves over time, it is often desirable to modify the existing classes, as well to add new classes. Some of these new classes may inherit from existing classes, while some may form new hierarchies of classes. In practice, when adding a new class to an existing object-oriented design, a developer will often not define the new class from scratch but rather locate a similar, already existing class, copy it, and then alter it as desired (for example, by adding and/or removing data members). As an example, the following class hierarchy taken from a hardware world can be considered (where 'A→B' is used to represent a relationship in which class A inherits from class B): NiceBridge→IOBridge"BasicBridge→HardwareComponent. If a developer seeks to add a new class, GoodBridge, that is similar to class NiceBridge and inherits from class BasicBridge, the developer may decide to implement the class by performing the following actions manually: (1) Create an identical copy of class IOBridge and name it class GoodBridge; (2) inspect the deltas between class NiceBridge and class IOBridge; and (3) apply the deltas to class GoodBridge.

In the above example, where the classes contain only a few attributes and data members, and where the inherited class is a close ancestor to the newly implemented class, performing the manual operations listed above can be a fairly simple task for the developer. In industrial-strength software systems (for example, data systems that maintain the integrity of hundreds or thousands of records of information while allowing concurrent updates and queries and systems for the command and control of real-world entities such as the routing of air or railway traffic) in which applications can be implemented with a very rich set of behaviors, class hierarchies with many levels, and classes with many attributes and data members, however, this task can be rather tedious and error-prone, particularly where the inherited class is several levels above the similar class. Industrial-strength software systems tend to have a long-lifespan, and applications in such systems are the means and artifacts of incremental and exploratory development. It can therefore be exceedingly difficult, if not impossible, for a developer to comprehend all the subtleties of the design of an industrial-strength software system.

SUMMARY

An exemplary embodiment of a method of automatically defining a new class in a class hierarchy specified in an object-oriented programming language includes creating a descendent class in the class hierarchy that descends from one or more specified ancestor classes of the class hierarchy; sequentially analyzing each class along each inheritance path from the one or more specified ancestor classes to a specified similar class in the class hierarchy to identify each class item in each class along each inheritance path that is not selected from the one or more specified ancestor classes; storing a respective pointer in a first data structure for each class item identified in each class that is not inherited by the class in which the class item is identified referencing the class item and associated with the class in which the class item is identified; storing a respective pointer in the first data structure for each class item identified in each class that is inherited and redefined by the class in which the class item is identified referencing the class item and being associated with the class in which the identified class item is identified if a pointer referencing the class item is not already stored in the first data structure; copying each class item referenced by a pointer stored in the first data structure to the descendent class.

Exemplary embodiments of the present invention that are related to computer program products and data processing systems corresponding to the above-summarized method are also described and claimed herein.

Additional features and advantages are realized through the techniques of the present invention. Other embodiments and aspects of the present invention are described in detail herein and are considered a part of the claimed invention. For a better understanding of the present invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the various embodiments of the present invention are apparent from the following detailed description of exemplary embodiments taken in conjunction with the accompanying drawings in which:

Figure 1:
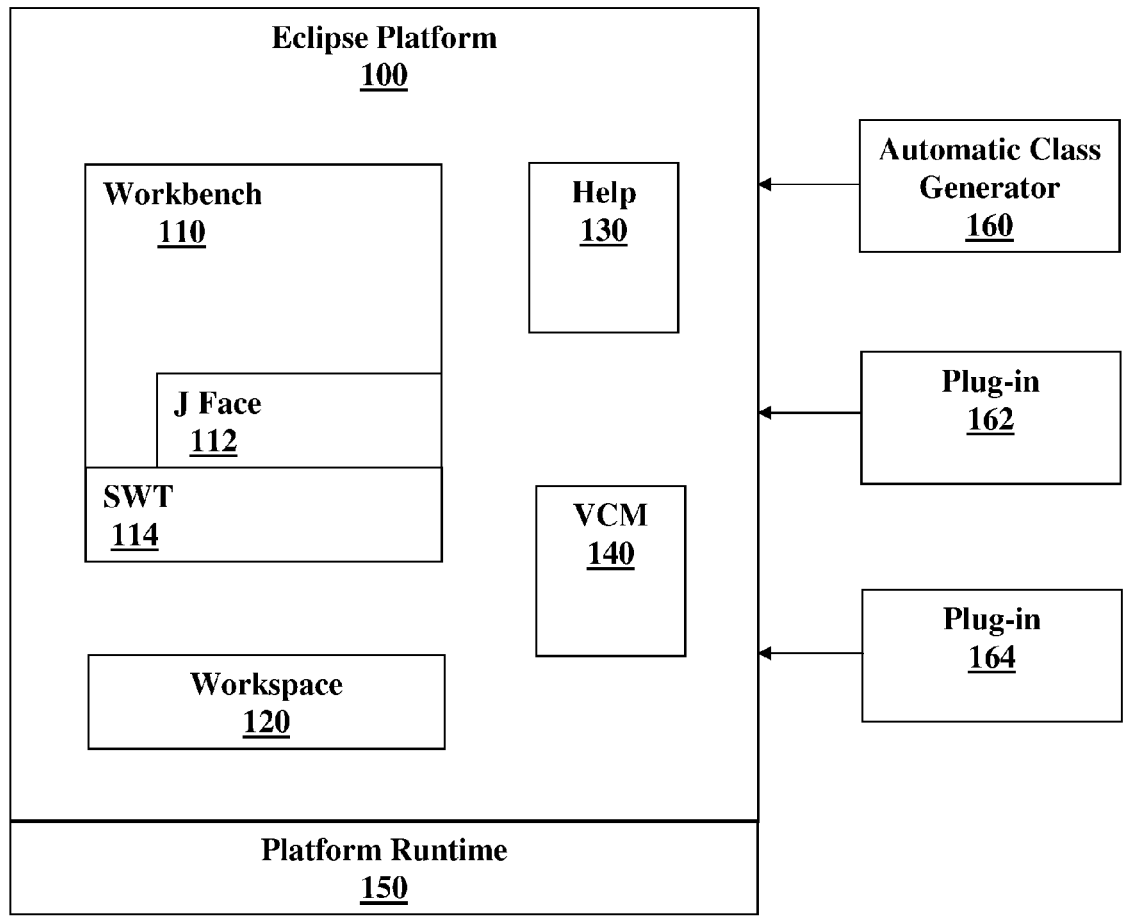
FIG. 1 is a block diagram illustrating an exemplary Eclipse IDE platform incorporating an exemplary embodiment of an automatic class generation module in accordance with the present invention.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION

While the specification concludes with claims defining the features of the present invention that are regarded as novel, exemplary will be better understood from a consideration of the detailed description in conjunction with the drawings. It is of course to be understood that the embodiments described herein are merely exemplary, which can be embodied in various forms. Therefore, specific structural and functional details disclosed in relation to the exemplary embodiments described herein are not to be interpreted as limiting, but merely as a representative basis for teaching one skilled in the art to variously employ embodiments in virtually any appropriate form, as well as any suitable modifications that may be made to these embodiments. Further, the terms and phrases used herein are not intended to be limiting but rather to provide an understandable description of exemplary embodiments of the present invention. As used herein, the singular forms "a", "an", and "the" are intended to include the plural forms as well, unless the content clearly indicates otherwise. It will be further understood that the terms "comprises", "includes", and "comprising", when used in this specification, specify the presence of stated features, integers, steps, operations, elements, components, and/or groups thereof Exemplary embodiments of the present invention can be implemented to provide an automatic mechanism for adding a new class to an existing class hierarchy of a software application being developed, where the new class is similar to an already-existing class in the class hierarchy and derived from one or more ancestors of the similar class in the class hierarchy that are not necessarily one or more immediate parents of the similar class (that is, the new class may be derived from one or more less proximate ancestors of the similar class than the immediate parents of the similar class in the class hierarchy). Exemplary embodiments can be implemented to perform an analysis of the inheritance paths in the class hierarchy to automatically identify the deltas between the similar, already-existing class and the one or more ancestor classes to the similar class in the class hierarchy from which the new class is derived, and to automatically modify a copy of the similar class to apply the identified differences between the similar class (that is, the similar class is utilized as a source class for the new class) and the one or more ancestor classes to the similar class from which the new class is derived. Exemplary embodiments can be implemented to handle derivation of both data member and member function class items in the new class being defined. By enabling these operations to be performed automatically, exemplary embodiments can be utilized by developers to avoid the time-consuming and error-prone task of performing these operations manually.

Exemplary embodiments of the present invention can be configured for incorporation within any suitable software development application such as, for example, an Integrated Development Environment (IDE). IDEs provide software developers with an environment in which the appropriate tools needed for source code editing, compiling, linking, testing, debugging, and profiling are seamlessly integrated. By using an IDE, a developer does not need to be concerned about the particular tool interfaces when moving from one phase of code development to another. A typical IDE will be configured to track the phase of code generation and take appropriate actions by invoking the necessary tool incorporated therewithin.

Referring now to FIG. 1, a simplified block diagram of an exemplary Eclipse IDE platform 100 incorporating an exemplary embodiment of an automatic class generation module in accordance with the present invention is illustrated. The Eclipse IDE is a project-based, open source environment for creating, integrating, and deploying application development tools across a broad range of computing technology. Eclipse platform 100, which can be utilized to develop software in a myriad of different programming languages, including object-oriented programming languages such as C++ and JAVA programming language, provides a common set of services and establishes the framework, infrastructure, and interactive workbench to build application software and related elements. Eclipse platform 100 includes, inter alia, a source code editor with code browsing and navigation features like code assist, syntax based color highlighting, and integrated help facilities that uses a graphical user interface.

Using Eclipse platform 100, a software developer, also referred to herein as a programmer or simply as a user, creates software by working on local copies of folders and files that are partitioned into named projects. Although Eclipse platform 100 incorporates built-in functionality, much of this functionality is very generic. Because additional tools are needed to extend the platform to work with new content types, to do new things with existing content types, and to focus the generic functionality on something specific, the Eclipse IDE is built on a mechanism for discovering, integrating, and running modules called plug-ins. The Eclipse IDE enables programmers to further extend one or more Eclipse-supplied or tool-supplied extension points by authoring Eclipse tools as plug-ins written in JAVA programmimng language. Because any plug-in is free to define new extension points and to provide new application program interfaces (APIs) for other plug-ins to use, the extension points for a plug-in can be extended by other plug-ins. An extension point may declare additional specialized XML element types for use in the extensions. In the present exemplary embodiment, Eclipse platform 100 is shown as being extended by three plug-in modules 160, 162, and 164. Of particular note, in the present exemplary embodiment, plug-in 160 is implemented as an exemplary automatic class generator and will be referenced herein as automatic class generator 160.

It should be noted that the present exemplary embodiment is non-limiting and presented for illustrative purposes only, and, in alternative exemplary embodiments, Eclipse platform 100 can be extended by any suitable number of various types of plug-in modules. It should also be noted that while the present exemplary embodiment is described as being integrated with the Eclipse IDE, other exemplary embodiments of the present invention can easily be implemented within and are equally pertinent to any other suitable IDEs used by programmers writing applications such as, for example, VisualAge C++ and VisualAge for JAVA programmimng language. Furthermore, although Eclipse and extensions to Eclipse are written in JAVA programmimng language, exemplary embodiments of the present invention are not limited to JAVA programmimng language implementations and can be implemented in any other suitable programming language. Eclipse is merely being used to provide an illustrative example of an existing IDE to enable one of skill in the art to better appreciate how exemplary embodiments may be integrated with any suitable IDE.

When Eclipse platform 100 is launched, a platform runtime module 150 discovers the set of available plug-ins, reads their XML manifest files, and builds an in-memory plug-in registry. Eclipse matches extension declarations by name with their corresponding extension point declarations. The resulting plug-in registry is available via a platform API implemented by platform runtime 150. A tool provider writes a tool as a separate plug-in that operates on files loaded into a workspace module 120 and surfaces its tool-specific user interface in a workbench module 110 that provides the overall structure and presents an extensible user interface to the user. Workbench 110 presents the software developer with an integrated development environment composed of the set of available plug-ins. The workbench API and implementation are built from two toolkits: a Standard Widget Toolkit (SWT) 114, which is a widget set and graphics library integrated with the native window system but independent of the operating system; and J Face 112, which is a user interface toolkit that simplifies common user interface programming tasks. The entire Eclipse platform user interface and the tools that plug into it use SWT 114 for presenting information to the user.

A team support component of Eclipse adds a version and configuration management (VCM) module 140 providing capabilities to projects loaded into workspace 110 and augments the workbench with views for presenting version and management concerns to the user. An Eclipse help module 130 allows tools to define and contribute documentation to one or more online books. For example, a tool usually contributes help style documentation in a user guide, and API documentation, if any, in a separate programmer guide. Eclipse platform 100 thereby implements all aspects of workbench window and perspective management. Editors and views are automatically instantiated as needed, and disposed of when no longer needed. The display labels and icons for actions contributed by a tool are listed in the plug-in manifest so that workbench 110 can create menus and tool bars without activating the contributing plug-ins. The Eclipse plug-in mechanism is also used to partition Eclipse platform 100 itself. That is, separate plug-ins provide workspace 120, workbench 110, platform runtime 150, etc.

In the present exemplary embodiment, as mentioned above, Eclipse IDE 100 is extended by automatic class generator 160 as a plug-in module. When automatic class generator 160 is being operated within Eclipse IDE 100, the user interface implemented by workbench 110 is configured to receive from the developer as input an already-existing class within a class hierarchy for an application presently being developed (that is, loaded into workspace 120) that is similar to a new class to be defined within a class hierarchy and one or more ancestor classes to the similar class in the class hierarchy from which the new class is to inherit. Upon receiving the specified user input, automatic class generator 160 is implemented to use the similar, already-existing class as a source class for the new class to be defined by creating a copy of the similar class, perform an analysis of the inheritance paths in the class hierarchy to automatically identify the deltas between the similar class and the specified one or more ancestor classes to the similar class, and to automatically modify the copy of the similar class to apply the identified differences between the similar, already-existing class and the one or more ancestor classes to the similar class. In exemplary embodiments, the actual class items that are copied from the similar class and modified by automatic class generator 160 will depend on the particular object-oriented programming language used to implement the application being developed and may include, for example, data members, member functions, constraints, multiple inherited classes, etc.

Figure 2:
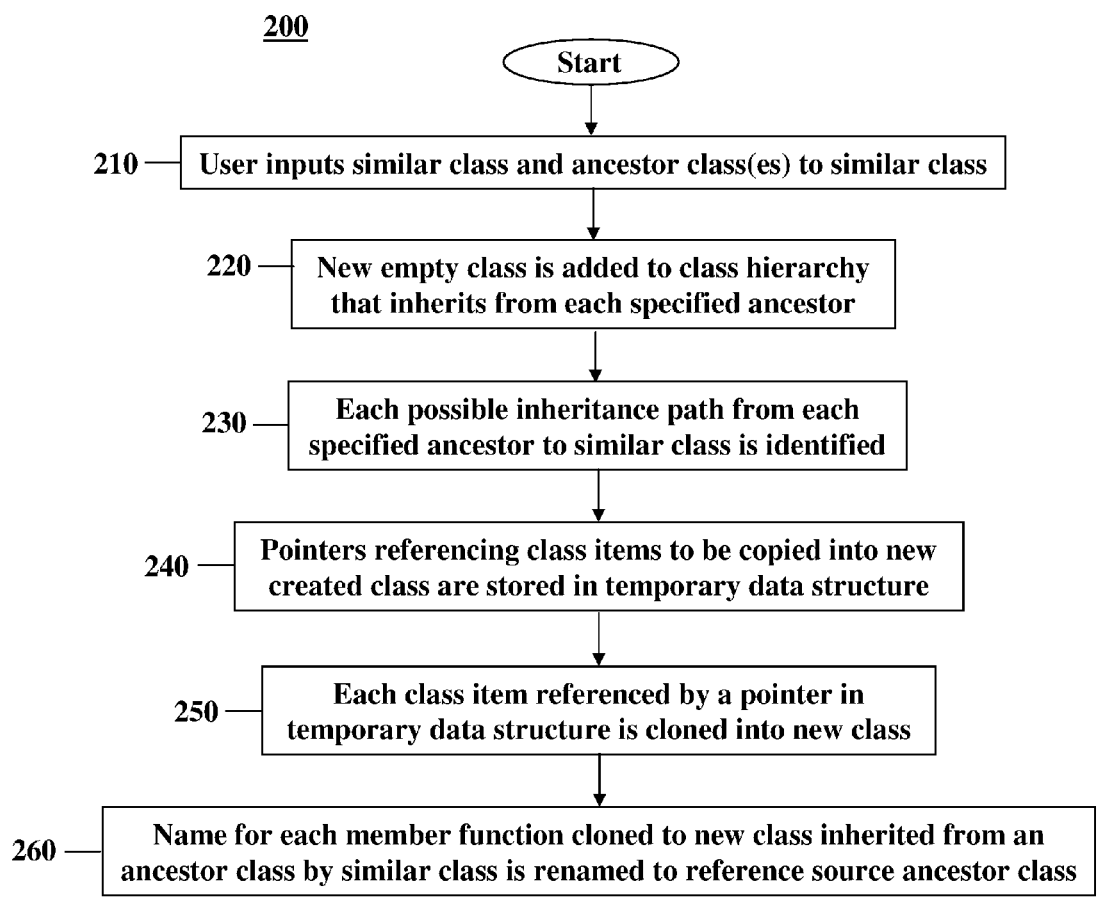
FIG. 2 is a flow diagram illustrating an exemplary embodiment of a process of adding a new class to an existing class hierarchy of a software application being developed in accordance with the present invention.
Figure 3A:
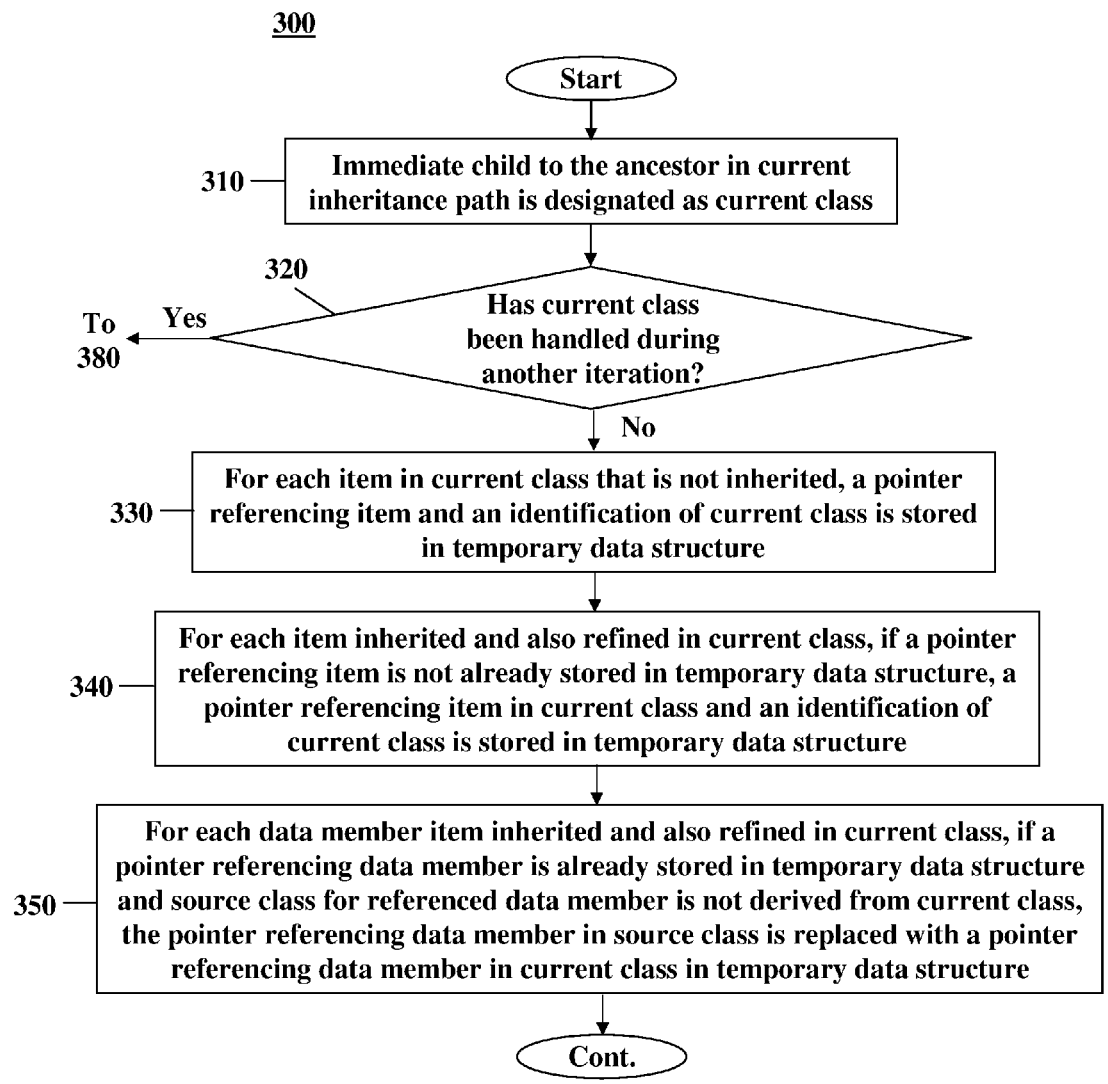
FIGS. 3a-3b illustrate a flow diagram providing an exemplary embodiment of a process of automatically modifying a copy of a similar class to apply the deltas between the similar class and an ancestor of the similar class in a class hierarchy.
Figure 3B:
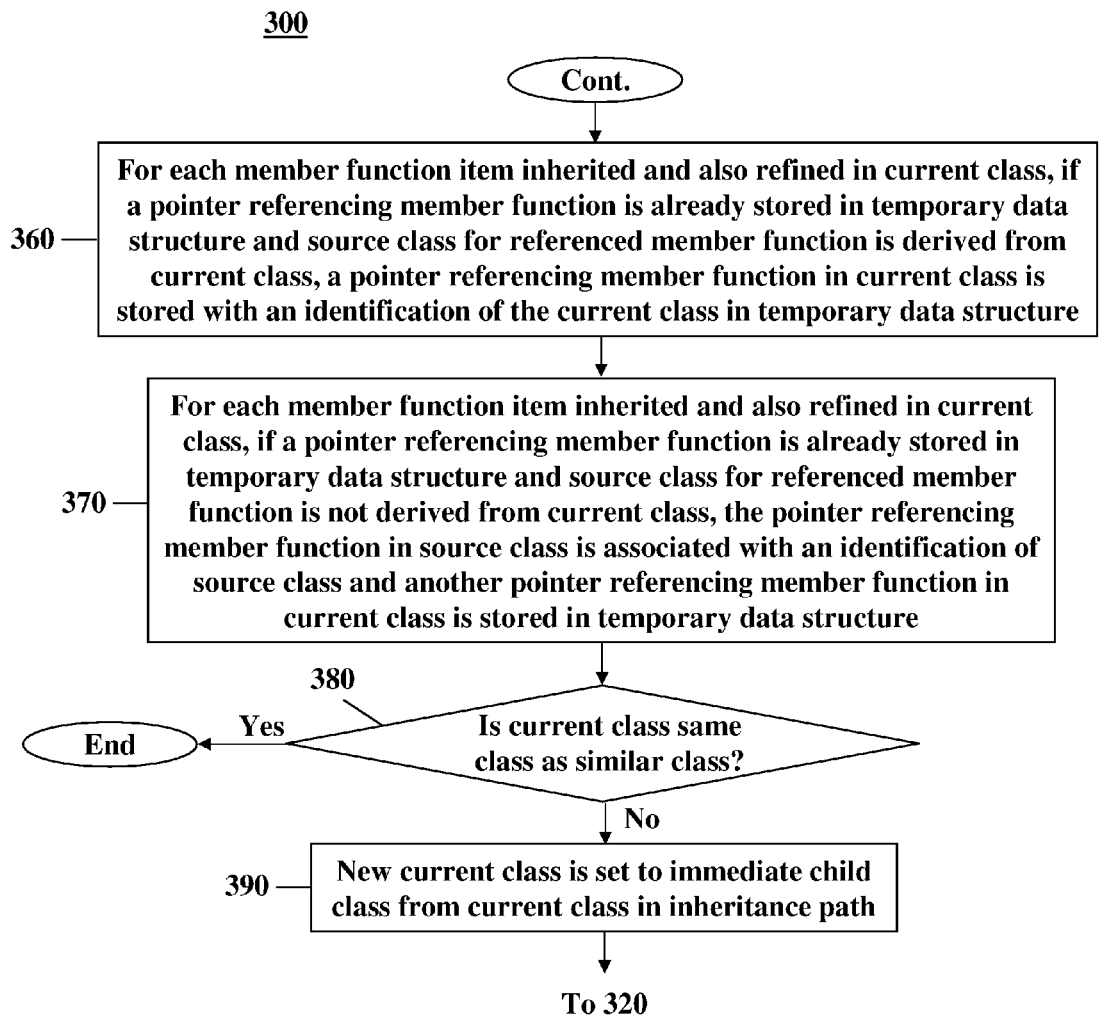

A more detailed description of the operations performed by automatic class generator 160 of the exemplary embodiment will now be provided with reference to FIGS. 2 and 3a-3b. FIG. 2 provides a flow diagram illustrating an exemplary embodiment of a process 200 of adding a new class to an existing class hierarchy of a software application being developed that is similar to an already-existing class in the class hierarchy and derived from one or more ancestors of the similar class in the class hierarchy that are not necessarily one or more immediate parents of the similar class. FIGS. 3a-3b provide a flow diagram illustrating an exemplary embodiment of a process 300 of automatically modifying a copy of the similar class to apply the deltas between the similar class and an ancestor of the similar class by analyzing the inheritance path from the ancestor to the similar class in a class hierarchy. To provide further illustration, exemplary process 200 and exemplary process 300 will be described herein with reference to an example class hierarchy 400 provided by the class diagram illustrated in FIG. 4. It should of course be noted that class hierarchy 400 is presented for exemplary purposes only, and that exemplary embodiments of the present invention can be applied to automatically add a new class to any suitable class hierarchy implemented using any suitable object-oriented programming language.

For purposes of the present example, class hierarchy 400 includes five already existing classes in the application being developed: class B 410, class Y 420, class C 440, class X 440, and class D 450. Each class in example class hierarchy 400 may include data members and member functions, and data members and member functions in an ancestor class can be refined in a derived class (that is, data members and member functions can be redefined in the inheriting class). Furthermore, to clarify ambiguity that may result from name clashes where two or more inherited classes provide a data member or a member function with the same name (that is, the "diamond problem" that can result from multiple inheritance when the same ancestor is inherited multiple times via different inheritance paths), a member function in a derived class may call previous definitions of the member function in the ancestor base classes, such as in the following example pseudo-code implementation of member function D::bb( ):

```
void D:bb( )
{
    C::bb( );
    X::bb( );
}
```

Figure 4:
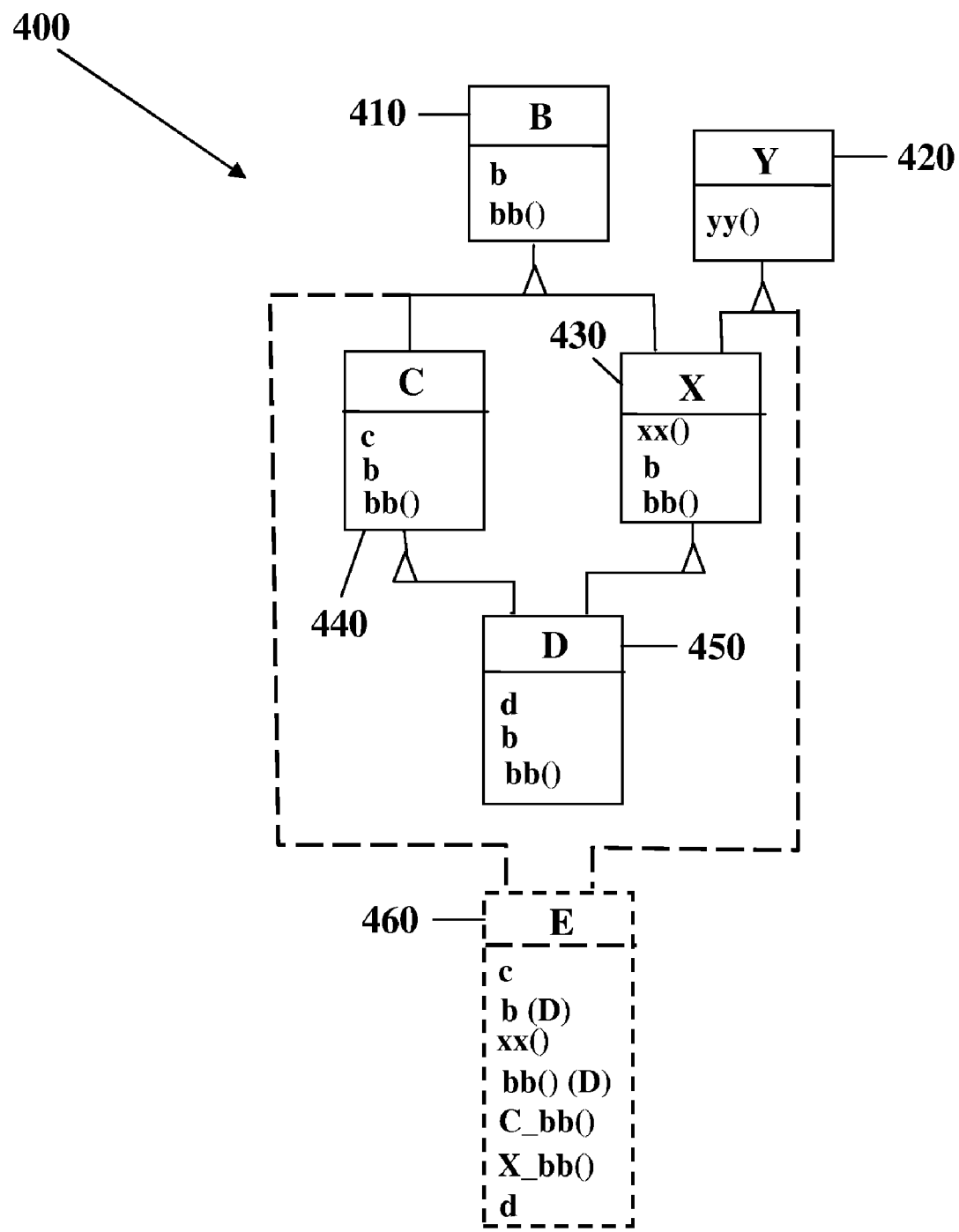
FIG. 4 is a class diagram illustrating an example class hierarchy.

As shown in FIG. 4, in example class hierarchy 400, class C 440 inherits from class B 410, class X 440 inherits multiply from class B 410 and class Y 420, and class D 450 inherits multiply from class C 440 and class X 440. In the present example, the developer wishes to create new class E 460 within class hierarchy 400 that is similar to class D 450 and has multiple inheritance from class B 410 and class Y 420.

Referring again to exemplary process 200 depicted in FIG. 2, at block 210, user input is received from the developer in the form of the already-existing class within the class hierarchy to use as a source class for the new class to be defined and the one or more ancestor classes to the similar class in the class hierarchy from which the new class is to be derived. That is, the developer specifies that it wants to create a new class, copied from the similar class, that is a child class of the each of the one or more ancestor classes to the similar class and includes all the changes defined in each of the inheritance paths in the class hierarchy from the one or more ancestor classes to the similar class. The user input received from the developer at block 210 may also include a specified name for the new class to be defined. In the case of multiple inheritance for the new class, the developer will specify each ancestor for which the inheritance path is to be analyzed. In example class hierarchy 400, the developer would specify class D 450 as the similar class and class B 410 and class Y 420 as the ancestor classes. Upon receiving the inputs from the user, at block 220, a new empty class is created and added to the class hierarchy that inherits from each specified ancestor class. In example class hierarchy 400, class E 460 is created as an empty class that inherits from class B 410 and class Y 420.

At block 230 in exemplary process 200, each possible inheritance path from each of the specified ancestor classes to the similar class copied to the newly created empty class is identified. In example class hierarchy 400, the inheritance paths identified at block 230 would be class B→class C→class D; class B→class X→class D; and class Y→class X→class D. At block 240, the deltas between the similar class and each specified ancestor class are identified by analyzing each inheritance path identified at block 230. During the operations performed at block 240, which will be described in greater detail below with reference to exemplary process 300 illustrated in FIGS. 3a-3b, pointers referencing the class items that are to be copied into the newly created class are created and maintained in a temporary data structure. At block 250, each class item referenced by a pointer maintained in the temporary data structure is cloned into the newly created class. At block 260, for each member function class item cloned into the newly created class at block 250, calling convention names for each member function inherited from the specified ancestor base classes are replaced with redefined versions referencing the ancestor base class for the member function to avoid name clashes and ensure the inherited function is not overridden in the new class. For instance, in exemplary class hierarchy 400, the call to C::bb( ) in class C 430 is replaced with E::C_bb( ) in class E 460.

Referring now to FIGS. 3a-3b, a flow diagram illustrating an exemplary embodiment of a process 300 of automatically identifying the deltas between the similar class and an ancestor class to the similar class by analyzing the inheritance path from the ancestor class to the similar class in the class hierarchy is provided. As discussed above, at block 240 of process 200, an iteration of exemplary process 300 is performed once for inheritance path identified at block 230. In FIG. 3a, at block 310, the immediate child class to the specified ancestor class in the inheritance path for the current iteration of exemplary process 300 is designated as the current class. At decision block 320, a determination is made as to whether the current class has already been handled during a different iteration of process 300 for another inheritance path from a specified ancestor class from which the newly created class is to be derived to the specified similar class. For instance, during the first iteration of process 300 for the inheritance path class B→class C→class D in example class hierarchy 400 of FIG. 4, the determination at block 320 is made with respect to class C 430, the immediate child to ancestor class B 410 in the inheritance path. If it is determined at block 320 that the current class has already been handled during a different iteration of process 300 for another inheritance path, process 300 proceeds to decision block 380 in FIG. 3b described below.

If it is determined at block 320 that the current class has not already been handled during a different iteration of process 300 for another inheritance path, process 300 proceeds to block 330. At block 330, for each class item in the current class that is not inherited from another class in the class hierarchy (that is, the current class is the base class for the class item), a pointer referencing the class item in the current class and an identification of the current class is created and maintained in the temporary data structure. At block 340, for each class item in the current class that is inherited by the current class and also refined in the current class from the source class from which the item was inherited by the current class, if a pointer referencing the class item has not already been created in the temporary data structure, a pointer referencing the class item in the current class and an identification of the current class is created and maintained in the temporary data structure.

At block 350, for each data member class item in the current class that is inherited by the current class and also refined in the current class from the source class from which the item was inherited by the current class, if a pointer referencing the data member class item has already been created in the temporary data structure and the source class for the data member class item that is already referenced by a pointer in the temporary data structure is not derived from the current class in the class hierarchy, the pointer referencing the data member class item that has been created in the temporary data structure is replaced with a pointer to the data member class item in the current class.

Referring now to FIG. 3b, at block 360, for each member function class item in the current class that is inherited by the current class (for example, member function C::bb( ) in example class hierarchy 400 during an iteration of exemplary process 300 in which class C 430 is the current class) and also refined in the current class from the source class from which the item was inherited by the current class, if a pointer referencing the member function class item has already been created in the temporary data structure and the source class for the member function class item that is already referenced by a pointer in the temporary data structure is derived from the current class in the class hierarchy, a new pointer referencing the member function class item in the current class is created and maintained in the temporary data structure. The new pointer referencing the member function class item in the current class is also associated with an identification of the current class in the temporary data structure so that when the referenced member function class item is cloned into the newly created class at block 260 of exemplary process 200, the calling conventions for the member function can be redefined to include the current class name in the newly created class to avoid name clashes and ensure the inherited member function is not overridden in the new class (for instance, in exemplary class hierarchy 400, the call to C::bb( ) in class C 430 is replaced with E::C_bb( ) in class E 460).

At block 370, for each member function class item in the current class that is inherited by the current class and also refined in the current class from the source class from which the item was inherited by the current class, if a pointer referencing the member function class item has already been created in the temporary data structure and the source class for the member function class item that is already referenced by a pointer in the temporary data structure is not derived from the current class in the class hierarchy, the already existing pointer is associated with an identification of the source class for the member function class item referenced by the already-existing pointer in the temporary data structure. This association is made at block 370 of exemplary process 300 so that when the referenced member function class item is cloned into the newly created class at block 260 of exemplary process 200, the calling conventions for the member function can be redefined to include the source class name in the newly created class to avoid name clashes and ensure the inherited member function is not overridden in the new class (for instance, in exemplary class hierarchy 400, the call to X::bb( ) in class X 420 is replaced with E::X_bb( ) in class E 460). Furthermore, if each of the conditions specified above are met at block 370, a new pointer referencing the member function class item in the current class is created and maintained in the temporary data structure (for instance, in exemplary class hierarchy 400, a pointer to the member function D::bb( ) in class D 450 is added to the temporary data structure so that the member function D::bb( ) is cloned into class E 460 as E::bb( ) at block 250 of exemplary process 200). Exemplary process 300 then proceeds to decision block 380.

At block 380, a determination is made as to whether the current class is the same class as the similar class in the class hierarchy (indicating that the end of the currently inheritance path being analyzed in the current iteration of exemplary process 300 has been reached). If the current class is not determined to be the same class as the similar class, process 300 proceeds to block 390, at which the current parent class is set to the current class, and the current class is set to the immediate child class from the new current parent class in the inheritance path being analyzed in the current iteration of exemplary process 300. Process 300 then returns from block 390 to block 320 in FIG. 3a. If the current class is determined to be the same class as the similar class at block 380, process 300 terminates for the particular inheritance path.

As discussed above, at block 240 in exemplary process 200, process 300 is performed once for each inheritance path identified at block 230. In exemplary process 200, the temporary data structure for maintaining pointers to the class items to be cloned at block 250 are instantiated once at block 240, and the same instance is maintained and operated upon throughout each iteration of exemplary process 300 for a specified ancestor class. Furthermore, throughout each iteration of exemplary process 300 at block 240 of exemplary process 200, a data structure listing each class that has already been handled in an iteration of process 300 for an ancestor class specified by the developer is maintained for reference during each occurrence of the determination made at decision block 320 of process 300 as to whether the current class has already been handled during another iteration of process 300.

Figure 5:
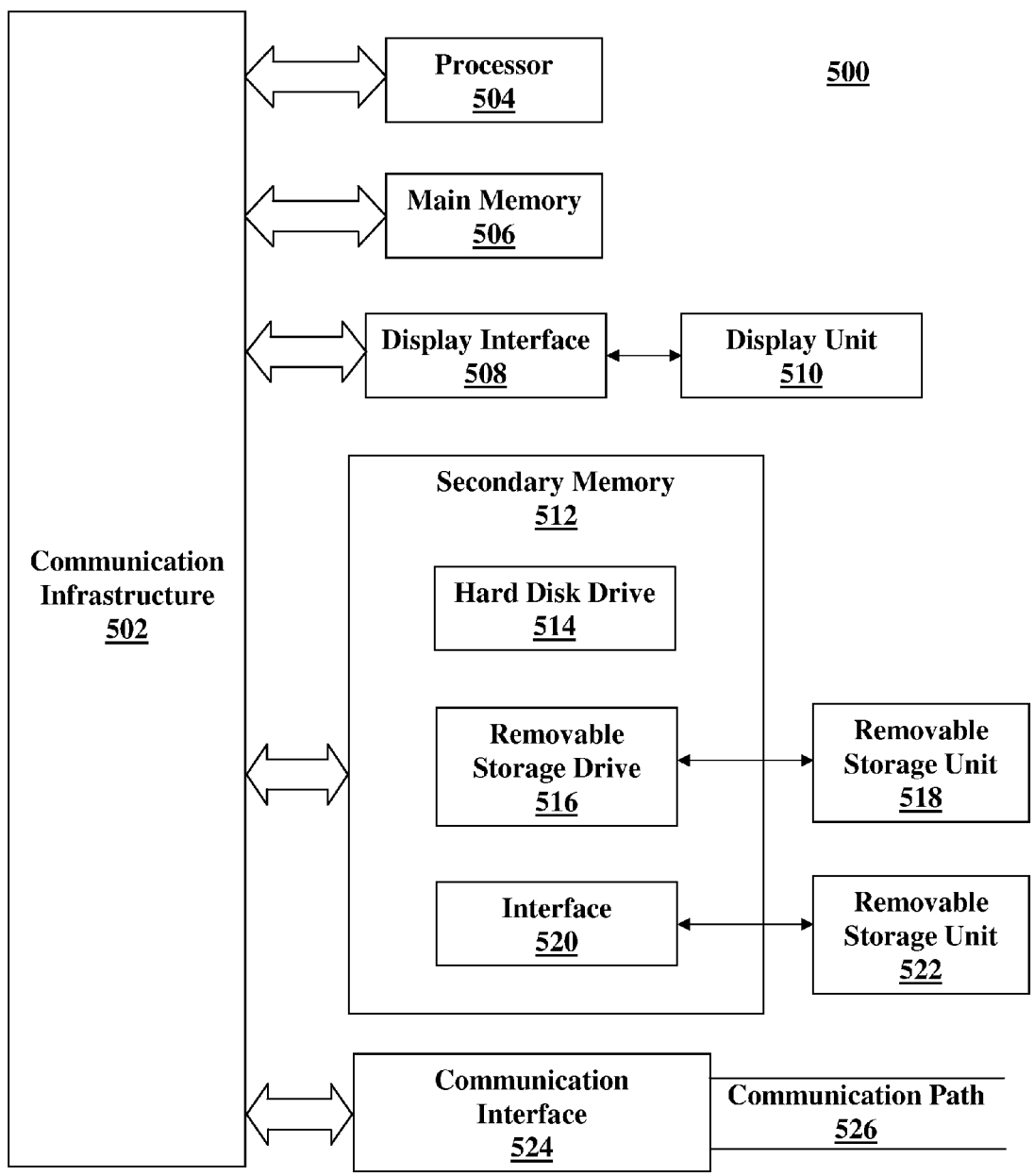
FIG. 5 is a block diagram illustrating an exemplary computer system that can be used for implementing exemplary embodiments of the present invention.

Exemplary embodiments of the present invention as presented herein can be implemented using one or more program modules and data storage units. As used herein, the term "modules", "program modules", "components", "systems", "tools", "utilities", and the like include routines, programs, objects, components, data structures, and instructions, or instructions sets, and so forth that perform particular tasks or implement particular abstract data types. As can be appreciated, the modules refer to computer-related entities that can be implemented as software, hardware, firmware and/or other suitable components that provide the described functionality, and which may be loaded into memory of a machine embodying an exemplary embodiment of the present invention. Aspects of the modules may be written in a variety of programming languages, such as C, C++, JAVA programming language, etc. As used herein, the terms "data storage unit," "data store", "storage unit", and the like can refer to any suitable memory device that may be used for storing data, including manual files, machine readable files, and databases. The functionality provided by exemplary embodiments can be combined and/or further partitioned. The modules and/or storage units can all be implemented and run on the same computing system (for example, the exemplary computer system illustrated in FIG. 5 described below) or they can be implemented and run on different computing systems. For example, one or modules can be implemented on a personal computer operated by a user while other modules can be implemented on a remote server and accessed via a network.

Exemplary embodiments of the present invention can be configured for incorporation within any suitable software development tool or application such as, for example, an Integrated Development Environment (IDE), as a plug-in, add-on, or extension supported by the server system or client systems. As used herein, the term "plug-in" can refer to a software application or module program, or one or more computer instructions, which may or may not be in communication with other software applications or modules, that interacts with a host application to provide specified functionality, and which may include any file, image, graphic, icon, audio, video, or any other attachment.

In the preceding description, for purposes of explanation, numerous specific details are set forth in order to provide a thorough understanding of the described exemplary embodiments. Nevertheless, one skilled in the art will appreciate that many other embodiments may be practiced without these specific details and structural, logical, and electrical changes may be made.

Some portions of the exemplary embodiments described above are presented in terms of algorithms and symbolic representations of operations on data bits within a processor-based system. The operations are those requiring physical manipulations of physical quantities. These quantities may take the form of electrical, magnetic, optical, or other physical signals capable of being stored, transferred, combined, compared, and otherwise manipulated, and are referred to, principally for reasons of common usage, as bits, values, elements, symbols, characters, terms, numbers, or the like. Nevertheless, it should be noted that all of these and similar terms are to be associated with the appropriate physical quantities and are merely convenient labels applied to these quantities. Unless specifically stated otherwise as apparent from the description, terms such as "executing" or "processing" or "computing" or "calculating" or "determining" or the like, may refer to the action and processes of a processor-based system, or similar electronic computing device, that manipulates and transforms data represented as physical quantities within the processor-based system's storage into other data similarly represented or other such information storage, transmission or display devices.

Exemplary embodiments of the present invention can be realized in hardware, software, or a combination of hardware and software. Exemplary embodiments can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

Exemplary embodiments of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following (a) conversion to another language, code or, notation; and (b) reproduction in a different material form.

A computer system in which exemplary embodiments can be implemented may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface including a wired network or a wireless network that allow a computer system to read such computer readable information.

FIG. 6 is a block diagram of an exemplary computer system 600 that can be used for implementing exemplary embodiments of the present invention. Computer system 600 includes one or more processors, such as processor 604. Processor 604 is connected to a communication infrastructure 602 (for example, a communications bus, cross-over bar, or network). Various software embodiments are described in terms of this exemplary computer system. After reading this description, it will become apparent to a person of ordinary skill in the relevant art(s) how to implement exemplary embodiments of the present invention using other computer systems and/or computer architectures.

Exemplary computer system 600 can include a display interface 608 that forwards graphics, text, and other data from the communication infrastructure 602 (or from a frame buffer not shown) for display on a display unit 610. Computer system 600 also includes a main memory 606, which can be random access memory (RAM), and may also include a secondary memory 612. Secondary memory 612 may include, for example, a hard disk drive 614 and/or a removable storage drive 616, representing a floppy disk drive, a magnetic tape drive, an optical disk drive, etc. Removable storage drive 616 reads from and/or writes to a removable storage unit 618 in a manner well known to those having ordinary skill in the art. Removable storage unit 618, represents, for example, a floppy disk, magnetic tape, optical disk, etc. which is read by and written to by removable storage drive 616. As will be appreciated, removable storage unit 618 includes a computer usable storage medium having stored therein computer software and/or data.

In exemplary embodiments, secondary memory 612 may include other similar means for allowing computer programs or other instructions to be loaded into the computer system. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between the computer system and external devices. Examples of communications interface 624 may include a modem, a network interface (such as an Ethernet card), a communications port, a PCMCIA slot and card, etc. Software and data transferred via communications interface 624 are in the form of signals which may be, for example, electronic, electromagnetic, optical, or other signals capable of being received by communications interface 624. These signals are provided to communications interface 624 via a communications path (that is, channel) 626. Channel 626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 606 and secondary memory 612, removable storage drive 616, a hard disk installed in hard disk drive 614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface including a wired network or a wireless network that allow a computer to read such computer readable information.

Computer programs (also called computer control logic) are stored in main memory 606 and/or secondary memory 612. Computer programs may also be received via communications interface 624. Such computer programs, when executed, can enable the computer system to perform the features of exemplary embodiments of the present invention as discussed herein. In particular, the computer programs, when executed, enable processor 604 to perform the features of computer system 600. Accordingly, such computer programs represent controllers of the computer system.

Although exemplary embodiments of the present invention have been described in detail, the disclosure is not intended to be exhaustive or limited to the described embodiments. It should be understood that various changes, substitutions and alterations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

The exemplary embodiments presented herein were chosen and described to best explain the principles of the various embodiments of the present invention and the practical application, and to enable others of ordinary skill in the art to understand the invention. It will be understood that those skilled in the art, both now and in the future, may make various modifications to the exemplary embodiments described herein without departing from the spirit and the scope of the present invention as set forth in the following claims. These following claims should be construed to maintain the proper protection for the various embodiments of the present invention.

The invention claimed is:

1. A method of automatically defining a new class in a class hierarchy specified in an object-oriented programming language, the method comprising:
   creating by a processor an empty class as a descendent class in the class hierarchy that descends from one or more specified ancestor classes of the class hierarchy;
   sequentially analyzing by the processor each class along each inheritance path from the one or more specified ancestor classes to a specified similar class of the class hierarchy to identify each class item in each class along each inheritance path that is not selected from the one or more specified ancestor classes;
   storing to memory by the processor a respective pointer in a temporary data structure for each class item identified in each class that is not inherited by the class in which the class item is identified referencing the class item and associated with the class in which the class item is identified;
   storing to the memory by the processor a respective pointer in the temporary data structure for each class item identified in each class that is inherited and redefined by the class in which the class item is identified referencing the class item and being associated with the class in which the identified class item is identified if a pointer referencing the class item is not already stored in the temporary data structure; and
   copying by the processor each class item referenced by a pointer stored in the temporary data structure to the descendent class.

2. The method of claim 1, wherein, for each class along each inheritance path from the one or more specified ancestor classes to the specified similar class, if the class has been analyzed along the inheritance path from one ancestor class of the one or more specified ancestor classes to the specified similar class, the class is not analyzed along the inheritance path from any other ancestor class of the one or more specified ancestor classes to the specified similar class.

3. The method of claim 1, wherein each class in the class hierarchy comprises zero or more data members and zero or more member functions.

4. The method of claim 3, further comprising, for each class item identified in each class that is a data member, is inherited and redefined by the class in which the class item is identified, and for which a pointer referencing the class item in another class in the class hierarchy that is not derived from the class in which the class item is identified is already stored in the temporary data structure, replacing the pointer referencing the class item in another class with a pointer referencing the class item in the class in which the class item is identified.

5. The method of claim 4, further comprising, for each class item identified in each class that is a member function, is inherited and redefined by the class in which the class item is identified, and for which a pointer referencing the class item in another class in the class hierarchy that is derived from the class in which the class item is identified is already stored in the temporary data structure, storing a pointer in the temporary data structure for the class item referencing the class item and associated with the class in which the class item is identified.

6. The method of claim 5, further comprising, for each class item identified in each class that is a member function, is inherited and redefined by the class in which the class item is identified, and for which a pointer referencing the class item in another class in the class hierarchy that is not derived from the class in which the class item is identified is already stored in the temporary data structure, associating the pointer referencing the class item in another class with the other class.

7. The method of claim 6, further comprising, for each class item identified in each class that is a member function, is inherited and redefined by the class in which the class item is identified, and for which a pointer referencing the class item in another class in the class hierarchy that is not derived from the class in which the class item is identified is already stored in the temporary data structure, storing a pointer in the temporary data structure for the class item referencing the class item.

8. The method of claim 7, further comprising, for each class item referenced by a pointer stored in the temporary data structure copied to the descendent class, if the class item is a member function and the pointer referencing the member function is associated with the class in which the class item is identified in the temporary data structure, renaming a calling convention for the class item in the descendent class to call the class item the class in which the class item is identified.

9. The method of claim 1, wherein the method is implemented within a software development application.

10. The method of claim 9, further comprising receiving the one or more specified ancestor classes and the specified similar class as input from a user of the software development application.

11. The method of claim 10, wherein the software development application is an integrated development environment.

12. The method of claim 1, wherein the integrated development environment is an Eclipse platform, and wherein the method is implemented within a plug-in module configured for execution on the Eclipse platform.

13. A tangible computer-usable medium having computer readable instructions stored thereon for execution by a processor to perform a method of automatically defining a new class in a class hierarchy specified in an object-oriented programming language, the method comprising:
   creating an empty class as a descendent class in the class hierarchy that descends from one or more specified ancestor classes of the class hierarchy;
   sequentially analyzing each class along each inheritance path from the one or more specified ancestor classes a specified similar class of the class hierarchy to identify each class item in each class along each inheritance path that is not selected from the one or more specified ancestor classes;
   storing a respective pointer in a temporary data structure for each class item identified in each class that is not inherited by the class in which the class item is identified referencing the class item and associated with the class in which the class item is identified;
   storing a respective pointer in the temporary data structure for each class item identified in each class that is inherited and redefined by the class in which the class item is identified referencing the class item and being associated with the class in which the identified class item is identified if a pointer referencing the class item is not already stored in the temporary data structure; and copying each class item referenced by a pointer stored in the temporary data structure to the descendent class.

14. A data processing system comprising:

at least one processor;

a random access memory for storing data and programs for execution by the at least one processor; and computer readable instructions stored in the random access memory for execution by the at least one processor to perform a method of automatically defining a new class in a class hierarchy specified in an object-oriented programming language, the method comprising:

creating an empty class as a descendent class in the class hierarchy that descends from one or more specified ancestor classes of the class hierarchy;

sequentially analyzing each class along each inheritance path from the one or more specified ancestor classes to a specified similar class of the class hierarchy to identify each class item in each class along each inheritance path that is not selected from the one or more specified ancestor classes;

storing a respective pointer in a temporary data structure for each class item identified in each class that is not inherited by the class in which the class item is identified referencing the class item and associated with the class in which the class item is identified;

storing a respective pointer in the temporary data structure for each class item identified in each class that is inherited and redefined by the class in which the class item is identified referencing the class item and being associated with the class in which the identified class item is identified if a pointer referencing the class item is not already stored in the temporary data structure; and copying each class item referenced by a pointer stored in the temporary data structure to the descendent class.

* * * * *